Patented Mar. 3, 1942

2,274,750

UNITED STATES PATENT OFFICE 2,274,750

RECOVERY OF HIGHER OXYGEN-CONTAINING ORGANIC COMPOUNDS FROM CRUDE OILS OBTAINED BY THE CATALYTIC HYDROGENATION OF CARBON OXIDES

Hans Soenksen, Ludwigshafen-on-the-Rhine-Oppau, and Herbert Grasshof, Mannheim, Germany, assignors, by mesne assignments, to William Ellyson Currie, New York, N. Y.

No Drawing. Application August 16, 1939, Serial No. 290,518. In Germany August 30, 1938

7 Claims. (Cl. 260—450)

The present invention relates to an improvement in the recovery of higher oxygen-containing compounds from crude oils obtained by the catalytic hydrogenation of carbon oxides.

In the catalytic hydrogenation of carbon oxides, especially carbon monoxide, to form higher oxygen-containing organic compounds, in particular isobutanol, a crude oil is obtained which contains, in addition to the said products, methanol which term includes crude methanol, i. e. methanol in admixture with minor parts of ethanol and propanol and an amount of water corresponding to the higher compounds formed. These higher compounds consist of preponderating amounts of alcohols containing other oxygen-containing compounds such as esters, lactones and ketones. The working up of such a reaction product by distillation is difficult and causes relatively high costs because the higher oxygen-containing products form numerous constant-boiling mixtures with the water. Thus the residue remaining after driving off the methanol must first be dehydrated in special columns in order to recover the higher-boiling alcohols and the other organic compounds. The distilling off of the methanol must also be carried out in very efficient columns and with relatively strong reflux and with consequent high consumption of steam in order to avoid loss of the valuable higher molecular products which form low-boiling mixtures with water. Finally for the purification of the methanol from small amounts of unsaturated hydrocarbon oils, special measures of distillation technique are often required and this again requires an increased consumption of steam.

For such cases it has already been proposed to purify the methanol after distilling it off from the crude oil by extraction with suitable solvents with the addition of salts but this method of working also occasions a high consumption of steam because the methanol has a very high heat of evaporation and in this case must be distilled twice. Apart from this fact, the crude oil freed from methanol must still be dehydrated in a troublesome manner in order to recover the valuable higher alcohols.

We have now found that the crude reaction product containing considerable amounts of high-boiling alcohols, in particular isobutanol, can be separated into methanol, ethanol and water on the one hand and isobutanol and other higher molecular oxygen-containing compounds on the other hand in an advantageous manner without it being necessary first to expel the methanol and then to dehydrate the higher products in a complicated manner, by subjecting the crude product to an extraction with a solvent having a preferential solvent power for the high molecular compounds and adding substances which reduce the solubility of the higher molecular products, in particular isobutanol, in the constituents miscible with water (namely the methanol which besides a little water contains small amounts of ethanol and propanol).

By working in this way the methanol, which needs only to be distilled off from the aqueous solution, is obtained in great purity, while on the other hand the higher alcohols after distilling off the extraction agent usually contain only from about 1.0 to 2.0 per cent by volume of water and my therefore be subjected to fractionation. In order to carry out the extraction, substances are added to the crude product which displace the equilibrium of distribution of the higher boiling products between aqueous methanol or ethanol and the extraction agent in such manner that the higher boiling products are entirely brought into solution by the extraction agent. Those substances are especially suitable which either exert a salting-out action on the higher oxygen-containing compounds or which are difficultly soluble or insoluble therein. For this purpose there may be mentioned in particular aqueous solutions of electrolytes, in particular inorganic salts, as for example sodium chloride, potassium chloride, potassium carbonate, potassium nitrate or mixtures of the same. Aqueous solutions of salts of organic acids, such as sodium acetate or potassium acetate, or also other substances, such as caustic soda or caustic potash solutions, may also be used alone or in admixture with salts of inorganic acids.

The concentration and the amount of the salt solutions to be used depends on the composition of the reaction products to be treated. Thus if the latter contains for example large amounts of products boiling above 120° C., the concentration and amount of the salt solution may be kept low, but in all cases the concentration and the amount of the solution is selected so that no deposition of salt takes place during the extraction by the salting-out action of the methanol. In the case of salts, such for example as potassium carbonate, which have little or no tendency to separate out, care must be taken that at the end of the extraction the methanol remains in the aqueous salt solution and is not separated out by the action of the salt, because otherwise the isobutanol would not be completely extracted.

In the case of salts which have a strong salting-out action and of which by reason of their great solubility rather concentrated solutions can be prepared, the amount of salt solution to be used may generally speaking be less than that of the product to be extracted, whereas in the case of salts having a smaller salting-out action and a smaller solubility, a larger amount of solution must be used in some cases. The concentration of the salt solution depends on the water content of the starting product to be treated. Since the latter usually does not amount to more than 25 per cent, not more than from 30 to 35 per cent solutions of the salts are used.

To explain this feature the following table gives the yields of extract obtained from one and the same crude oil with 24 per cent of higher-boiling products when using additions of varying nature and amount in the extraction with isopentane according to the following Example 1.

| Amount of crude oil used— | | Addition in ccs. | Concn. of salt soln. in percent by weight | Extract obtained— | |
|---|---|---|---|---|---|
| In ccs. | In grams | | | In grams | In percent by weight |
| 350 | 298.9 | No addition | | 40.6 | 13.6 |
| 250 | 212.4 | 1,600 water | | 26.0 | 12.2 |
| 325 | 278.4 | 325 potassium carbonate solution | 32.5 | 66.3 | 23.8 |
| 250 | 212.2 | 400 common salt solution | 23.5 | 49.8 | 23.5 |
| 250 | 212.4 | 400 caustic soda solution | 35 | 50.3 | 23.7 |
| 250 | 212.3 | 250 sodium acetate solution | 36 | 45.6 | 21.5 |

The excellent action of the additions may be clearly seen from this table.

As extraction agents there may be mentioned all substances which have a great solvent power for the higher-boiling products and a lower boiling point than the said higher-boiling products and which are immiscible or but slightly miscible with aqueous methanol or ethanol, as for example hydrocarbons, carbon disulphide, carbon tetrachloride. They should further not form azeotropic mixtures with the higher-boiling products, especially the isobutanol, or should form only those having a small content of isobutanol, and should not tend to form emulsions with the mixture to be extracted. All these conditions are satisfied in an excellent manner by the aliphatic hydrocarbons containing less than 7 carbon atoms.

The amount of extraction agent to be used depends on the desired water content of the extracted higher-boiling products. The more extraction agent employed, the less water does the higher-boiling product obtained contain. The water content also depends on the kind of solvent.

In order to carry out the process, the crude product mixed with the necessary amount of salt solution is allowed to flow in counter-current to the extraction agent in a counter-current column. The extraction agent containing the higher-boiling products is separated from the latter by distillation and is returned to circulation. The higher-boiling products may be separated from each other by distillation. The salt solution obtained during the extraction is freed from methanol and ethanol by distillation and then if desired brought to the original concentration by evaporation. It is preferable not to evaporate the whole of the solution to the original concentration, but to concentrate a part very strongly and then to combine it in the appropriate ratio with the extracted salt solution freed from methanol and ethanol.

Instead of working continuously in a counter-current column, it is also possible to work discontinuously, for example by allowing finely divided solvent to flow through a filter plate and through the mixture of crude product and salt solution and leading it into a vessel in which it is freed from extract by distillation, whereupon after condensation in a condenser it is again used for further extractions.

According to this invention it is generally speaking suitable to work at atmospheric pressure and ordinary temperature, but increased pressure and elevated temperature may also be used. If the crude product is also to be simultaneously freed from any unsaturated hydrocarbon oils present, which otherwise according to the above-mentioned method of working may be present in the higher-boiling products obtained by the extraction and may render difficult a fractionation of the same, this may also be effected by a simple extraction with a solvent. In this case the crude product, before being separated into methanol and water on the one hand and isobutanol and higher alcohols on the other hand, is subjected to a preliminary extraction with small amounts of a solvent not miscible with water without the aid of an electrolyte. In this way the unsaturated hydrocarbons and a part of the highest-boiling oxygen-containing products are extracted, while the isobutanol remains in the crude oil. Instead of the unsaturated hydrocarbons the material will now contain a certain amount of the extraction agent dissolved therein; therefore it is advantageous to use for the preliminary extraction the same solvents which are employed in the following main extraction in the presence of an electrolyte.

The higher oxygen-containing organic compounds obtainable by the above process may be obtained practically free from water if the constituents miscible with water in any proportions which increase the solubility of the water in the higher oxygen-containing compounds and which are contained in the solution of the higher oxygen-containing organic compounds in the extraction agent by the above process are removed by treatment with a solvent before the removal of the extraction agent.

Since in the case of the substances causing the solubility of water in the higher oxygen-containing compounds it is mainly a question of residual amounts of methanol, there may be mentioned in particular for this further treatment those solvents which remove the methanol and at the same time are not miscible or are only slightly miscible with the extraction agent, such as water or aqueous solutions of polyhydric alcohols. Aqueous solutions of electrolytes, in particular of bases or salts of inorganic acids are also especially suitable; these may therefore be used not only for the extraction of the higher products of the crude oil first carried out but also for the after-treatment of the solution thus obtained. In this case there is the further advantage that the after-treatment may be carried out together with the extraction in the same apparatus. Thus for example the electrolyte solution may be so introduced into the counter-current column used in the following Example 2 that the extraction agent, after it has already taken up the higher products of the crude oil, is exposed to the action of this electrolyte solution before leaving the column. For example if the extraction agent be led into the lower part of the counter-current column, the crude oil at about the middle and the electrolyte solution at a suitable distance above the middle of the column, the solution of the higher oxygen-containing compounds in the extraction agent comes into very intimate contact with the electrolyte solution before it leaves the column, whereby the last traces of methanol are removed therefrom. This has the result that also the water dissolved in the extraction agent solution by the agency of the methanol is expelled therefrom. It then contains only so much water as corresponds to the slight solubilising agency of the high-boiling products contained therein. Its water content is so small that when distilling off the extraction agent the water almost completely passes over therewith even when an extraction agent, such as isopentane, is used which forms with water an azeotropic mixture with only a very small water content. The high-boiling oxygen-containing organic compounds are therefore obtained practically free from water.

The following examples will further illustrate how the said invention may be carried out in practice but the invention is not restricted to these examples.

Example 1

In an extraction apparatus of 700 cubic centimeters capacity and provided with a filter bottom there are charged 325 cubic centimeters of a crude product (formed by the catalytic hydrogenation of carbon monoxide and containing considerable amounts of higher-boiling products in addition to methanol and water) and 325 cubic centimeters of an aqueous 32.5 per cent solution of potassium carbonate and 150 cubic centimeters of isopentane (boiling point from 27° to 34° C.). After an extraction duration of 2 hours, the resulting pentane solution is separated and the isopentane distilled off in a distillation head according to Widmer up to 40° C. and the isopentane distilled off is subjected to a further distillation up to 36° C. The total residue, which has a water content of 0.06 per cent by volume is separated into single fractions by distillation. The amount of the fractions obtained agrees well with the amount of the fractions obtained from the same crude product without extraction, i. e. by expelling the methanol and then dehydrating and fractionating the residue.

Example 2

A crude product formed by the catalytic hydrogenation of carbon monoxide and containing considerable amounts of higher-boiling products in addition to methanol and water in admixture with an aqueous 27 per cent solution of potassium carbonate is extracted with isopentane in a counter-current column 2 meters long and 2.7 centimeters in internal diameter which has a volume of 0.7 litre when filled with 5 millimeter filling rings. The hourly throughputs are 0.54 litre of isopentane, 0.46 litre of crude product and 0.33 litre of potassium carbonate solution. Per hour there are obtained 0.72 litre of pentane solution and 0.62 litre of potassium carbonate-methanol mixture. After distilling off the isopentane up to 40° C., 0.14 litre of oxygen-containing higher-boiling products are obtained having a water content of 2.3 per cent by volume. These are subjected to a fractional distillation, the aqueous first runnings being returned to the crude product or subjected to a special extraction. The aqueous potassium carbonate methanol solution is distilled in a column whereby pure methanol passes over with a small after runnings of ethanol and propanol.

Example 3

A crude product formed by the catalytic hydrogenation of carbon monoxide and containing considerable amounts of higher-boiling products in addition to methanol and water containing from about 1 to 2 per cent of unsaturated hydrocarbons is first shaken twice with 20 per cent by volume of hexane each time and then extracted as described in Example 1 after an addition of salt solution. The isobutanol obtained from the extract by fractional distillation is free from unsaturated hydrocarbons.

Example 4

In the counter-current column described in Example 2, a crude product containing from about 1 to 2 per cent of unsaturated hydrocarbons is first extracted with isopentane without any addition of salt. The throughputs per hour are 2.4 litres of crude product and 0.3 litre of isopentane. The extraction is then carried out in a second column with an addition of potassium carbonate solution as described in Example 2. The methanol which is then driven off in a distilling column is free from unsaturated hydrocarbons as is also the isobutanol obtained from the extract.

Example 5

A crude product formed by the catalytic hydrogenation of carbon monoxide and containing considerable amounts of higher-boiling products in addition to methanol and water in admixture with a 27 per cent aqueous potassium carbonate solution is extracted with liquid propane under the pressure of 8 atmospheres which is set up at room temperature in a pressure-tight counter-current column 2 meters long and 3 centimeters in internal diameter which is filled with 5 millimeter filling rings. The throughputs per hour are 1.9 litres of liquid propane, 1.2 litres of crude product and 1.3 litres of potassium carbonate solution. Pure methanol may be recovered by distillation from the extracted potassium carbonate solution freed from the high-boiling products.

Example 6

In a counter-current column 2 meters long and 2.7 centimeters in internal diameter and having an active volume of 0.7 litre when filled with a 5 millimeter filling rings, a crude product obtained by high pressure hydrogenation of carbon monoxide and consisting of 24 per cent by volume of higher-boiling products, 57 per cent by volume of methanol and 19 per cent by volume of water, is subjected to an extraction by means of isopentane according to Example 2. Before introduction into the column, the crude product is mixed with a 27 per cent potassium carbonate solution. The throughputs per hour are 0.5 litre of isopentane, 0.5 litre of crude product and 0.35 litre of potassium carbonate solution. There are obtained per hour 0.62 litre of pentane solution and 0.73 litre of potassium carbonate methanol mixture. If the isopentane be distilled off from the pentane solution up to 40° C., an extract consisting of higher-boiling oxygen-containing organic compounds is obtained which has a water content of 2.5 per cent by volume. If, however, 0.6 litre of the pentane solution is shaken four times, each with 70 cubic centimeters of water before the isopentane is expelled, the aqueous layer being carefully separated, the higher-boiling oxygen-containing compounds remaining after distilling off the isopentane contain only 0.1 per cent by volume of water.

*Example 7*

The pentane solution leaving the counter-current column according to Example 6 is led into a second column of the same size as the first and washed therein in counter-current with a 27 per cent potassium carbonate solution. The throughputs per hour are 0.6 litre of pentane solution and 0.35 litre of potassium carbonate solution. From the pentane solution leaving the second column, after distilling off the pentane, the higher-boiling organic compounds are obtained with a water content of only 0.3 per cent by volume. The potassium carbonate solution used for the washing may be used for the extraction in the first column.

*Example 8*

In order to be able to carry out the washing of the pentane solution simultaneously with the extraction in one column, the column used in Examples 6 and 7 is lengthened and a second inlet is provided 0.5 meter above the inlet for the crude product. The part between these two inlets, in which the washing of the pentane solution with the potassium carbonate solution is effected, is filled with 5 millimeter filling rings like the rest of the column. Potassium carbonate solution is introduced at the uppermost inlet, the crude product at the central inlet and the isopentane at the lowermost inlet. The throughputs per hour are 0.5 litre of isopentane, 0.5 litre of crude product and 0.35 litre of the 27 per cent potassium carbonate solution. The crude product is the same as is used in Example 6. There are obtained per hour 0.60 litre of pentane solution and 0.75 litre of potassium carbonate-methanol mixture. After distilling off the isopentane there are obtained from the pentane solution higher-boiling oxygen-containing products with a water content of 0.3 per cent by volume.

What we claim is:

1. Process for recovering higher boiling oxygen-containing organic compounds from a crude oil obtained by catalytic hydrogenation of a carbon oxide and containing a large amount of methanol which comprises subjecting the said crude oil to an intense extraction with an organic solvent having a preferential solvent power for the higher boiling oxygen-containing substances while adding a highly soluble alkali metal compound which reduces the solubility of the said higher boiling products in the portion miscible with water in such a quantity that the resulting mixture contains a concentrated solution thereof and separating the said higher boiling products with the said solvent in which they have dissolved.

2. The process as defined in claim 1, wherein said highly soluble alkali metal compound is inorganic.

3. In the process for recovering higher-boiling oxygen-containing organic compounds from a crude oil obtained by the catalytic hydrogenation of carbon oxides which contains a substantial amount of methanol by extraction with solvents having a preferential solvent power for the higher-boiling oxygen-containing substances as claimed in claim 1 the step which comprises removing unsaturated hydrocarbons present in the crude oil before separation of the higher-boiling oxygen-containing organic substances by a preliminary extraction with small amounts of an extracting agent without addition of substances which reduce the solubility of the said higher-boiling products in the portion miscible with water.

4. In the process for recovering higher-boiling oxygen-containing organic compounds from a crude oil obtained by the catalytic hydrogenation of carbon oxides which contains a substantial amount of methanol by extraction with solvents having a preferential solvent power for the higher-boiling oxygen-containing substances by adding during the extraction substances which reduce the solubility of the said higher-boiling products in the portion miscible with water as claimed in claim 1 the step which comprises treating the extract solution obtained with an agent dissolving those constituents contained in the said extract solution which are miscible with water in any proportions and which cause the increased solubility of water in the higher-boiling oxygen-containing organic compounds.

5. In the process for recovering higher-boiling oxygen-containing organic compounds from a crude oil obtained by the catalytic hydrogenation of carbon oxides which contains a substantial amount of methanol by extraction with solvents having a preferential solvent power for the higher-boiling oxygen-containing substances by adding during the extraction substances which reduce the solubility of the said higher-boiling products in the portion miscible with water as claimed in claim 1 the step which comprises treating the extract solution obtained with such an agent dissolving those constituents contained in the said extract solution which are miscible with water in any proportion and which increase the solubility of water in the higher-boiling oxygen-containing organic compounds as is from immiscible to only slightly miscible with the extracting agent.

6. In the process for recovering higher-boiling oxygen-containing organic compounds from a crude oil obtained by the catalytic hydrogenation of carbon oxides which contains a substantial amount of methanol by extraction with solvents having a preferential solvent power for the higher-boiling oxygen-containing substances by adding during the extraction substances which reduce the solubility of the said higher-boiling products in the portion miscible with water as claimed in claim 1 the step which comprises treating the extract solution obtained with water.

7. In the process for recovering higher-boiling oxygen-containing organic compounds from a crude oil obtained by the catalytic hydrogenation of carbon oxides which contains a substantial amount of methanol by extraction with solvents having a preferential solvent power for the higher-boiling oxygen-containing substances by adding during the extraction substances which reduce the solubility of the said higher-boiling products in the portion miscible with water as claimed in claim 1 the step which comprises treating the extract solution obtained with an aqueous solution of an inorganic salt.

HANS SOENKSEN.
HERBERT GRASSHOF.